INVENTORS
SEMI JOSEPH BEGUN
EVERETT R. SARRATT
DEAN R. CHRISTIAN
JOHN F. BLAHA

BY *William J. Flynn*
ATTORNEY

INVENTORS.
SEMI JOSEPH BEGUN
EVERETT R. SARRATT
DEAN R. CHRISTIAN
JOHN F. BLAHA

BY William J. Flynn
ATTORNEY

United States Patent Office 2,803,515
Patented Aug. 20, 1957

2,803,515

RECORDING APPARATUS

Semi Joseph Begun, Cleveland Heights, Ohio, Everett R. Sarratt, Paterson, N. J., and John F. Blaha, North Royalton, and Dean R. Christian, Medina, Ohio, assignors to Clevite Corporation, Cleveland, Ohio, a corporation of Ohio Application January 5, 1954, Serial No. 402,388

14 Claims. (Cl. 346—74)

This invention relates generally to the recording of transient phenomena, that is, signals of relatively short duration, and is particularly directed to improvements in multichannel recording apparatus for geophysical exploration work.

In its general aspect the present invention is concerned with the recording of transient signals, having a duration of the order of a few seconds or less. For this purpose the present invention incorporates a novel arrangement for recording such signals magnetically and immediately thereafter reproducing the magnetically recorded signals as visual records.

In many such applications, it is required to record a plurality of such transient signals simultaneously and to maintain precisely the time relationship among the signals in recording them. To this end, the present invention has provision for recording a plurality of such signals on a multichannel magnetic record so as to maintain precisely the time relationship among the individual signals and thereafter reproducing the magnetically recorded signals as individual visual records on a multichannel visual record chart, the visual records having the same time relationship as the magnetically recorded signals.

In its specific aspect, the present invention is concerned with geophysical exploration work, such as prospecting for oil. In geophysical exploration work, multichannel recording techniques have been adopted extensively for the purpose of providing a visual presentation of signals picked up by properly spaced geophones after a dynamite charge has been exploded in the ground. Experienced observers are able to deduce much valuable information about the prospective oil or other mineral-bearing properties of a particular locale by studying the signals received by the geophones following such an explosion.

Since such geophysical prospecting must be done in widely scattered areas it is particularly desirable to make the multichannel recording equipment readily transportable, as by a truck.

Among the other requirements for a practical geophysical recording arrangement, the following are important:

(1) Ability to record within 1.5 decibels signal frequencies within the range from at least 20 to 500 cycles per second;

(2) Ability to preserve the time relationship among the geophone signals with an accuracy better than one millisecond;

(3) A signal-to-noise ratio of 30 db or better;

(4) A signal recording interval of about five seconds following the explosion;

(5) A visual record available shortly after each explosion so that, before moving to another location, a quick check can be made as to whether the explosion was effective and the geophones and the rest of the recording equipment worked properly; and (6) Ability to withstand transportation over rough terrain in a wide variety of climatic conditions, some rather severe.

The present invention is concerned with apparatus for making multichannel recordings which satisfies the foregoing requirements, as well as other practical requirements involved in geophysical exploration.

Another important practical consideration is the desirability of employing a multichannel recording technique which will enable the signals received by the geophones to remain preserved, or "memorized," indefinitely so as to be available for study at a later time. Such signal preservation would be a valuable aid in improving the techniques of interpreting such recordings, as well as for other purposes.

Accordingly, it is an object of the present invention to provide novel and improved multichannel apparatus for recording transient signals which is particularly suitable for geophysical exploration work.

Another object of this invention is to provide novel multichannel recording apparatus for transient signals having provision for recording several such signals simultaneously and immediately reproducing the recorded signals as visual records without phase shift and in absolute synchronization.

In the preferred embodiment of the present invention, the foregoing objects are accomplished by the provision of a recording arrangement in which a plurality of individual magnetic recordings of the signals to the individual geophones are made simultaneously, and immediately thereafter the magnetic recordings are reproduced individually in sequence as visual records, from which an immediate determination as to the general results of the test may be made. The magnetic recordings cover the full frequency range of the seismic signals and may be preserved indefinitely for more precise reproduction at a later time into visual records, covering the full frequency range or any desired portion thereof, from which the test results may be more exactly determined.

From the following description of the preferred specific embodiment of the present invention, illustrated in the accompanying drawings, other and further objects and advantages of the invention will be apparent.

*Overall operation*

Figure 1:
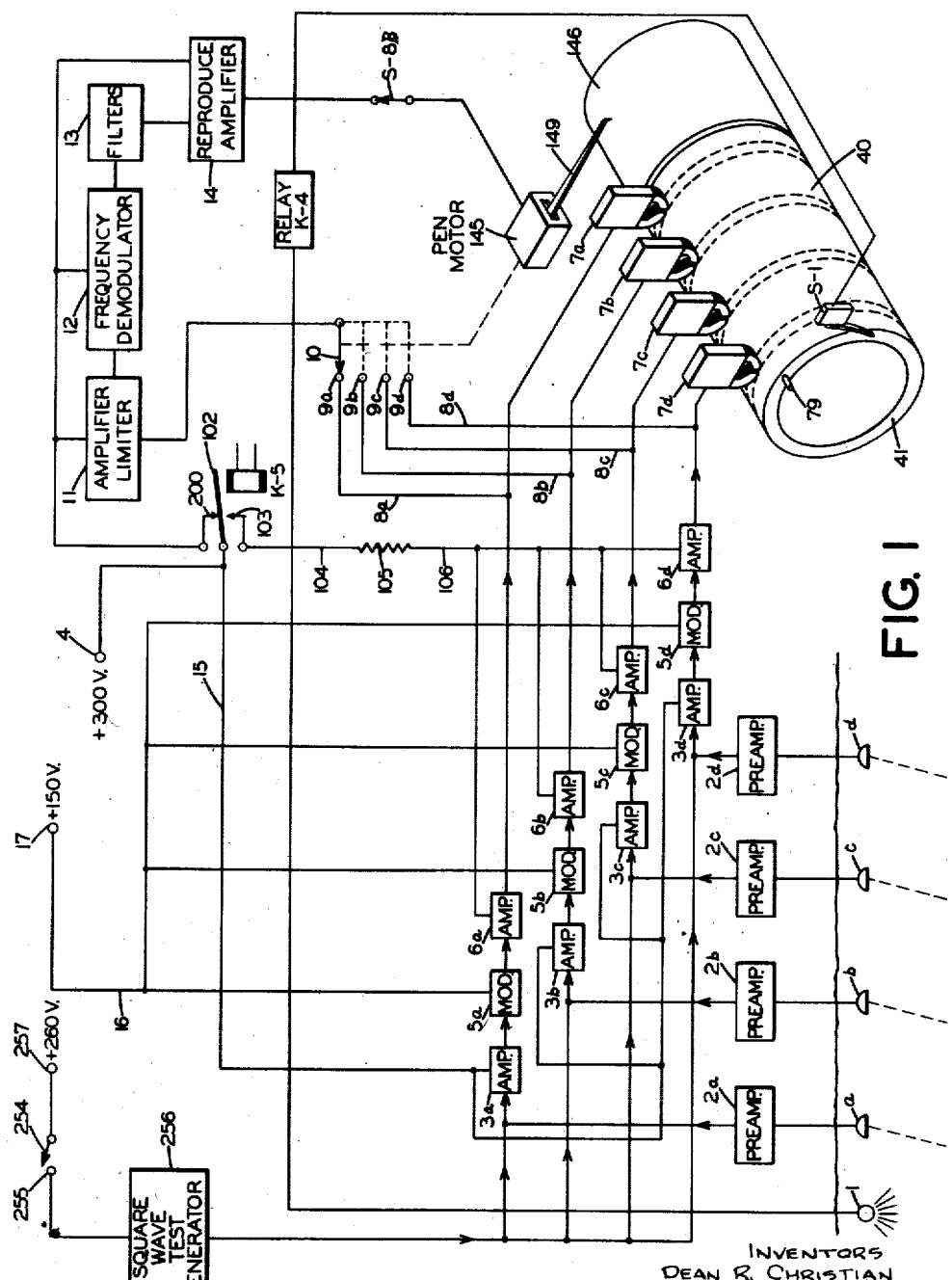
Figure 1 is a schematic diagram showing the present apparatus arranged in a geophysical exploration system.

Referring to Fig. 1, in the geophysical exploration system which incorporates the present invention there is provided an explosive source 1 embedded in the ground and a plurality of spaced geophones, a, b, c, d, in the ground at predetermined positions with respect to the explosive source. In actual practice, about fourteen such geophones would be provided, but in the schematic illustration in Fig. 1 their number is reduced for the sake of clarity.

The signals received by the geophones are fed through pre-amplifiers 2a, 2b, 2c, and 2d, respectively, which have their respective outputs connected to amplifiers 3a, 3b, 3c, and 3d. These amplifiers receive their power supply from the 300 volt D. C. power supply 4 through a line 15. These amplifiers feed into multivibrator type modulators 5a, 5b, 5c, and 5d, respectively, which are frequency modulated by the geophone signals. The power supply for each modulator is from the 150 volt power supply terminal 17 through line 16. The modulator outputs are supplied to the recording stage amplifiers 6a, 6b, 6c, and 6d, respectively, which have their respective outputs connected to the coils of the magnetic recording and reproducing heads 7a, 7b, 7c, and 7d. The power supply for each of the amplifiers 6a—6d is from power supply 4 by way of the normally open contacts 102, 103 of relay K–5, and thence through line 104, resistor 105 and line 106. With this arrangement it is necessary to energize relay K–5, to close the mobile contact 102 on the fixed contact 103, in order to energize the amplifiers 6a—6d and thereby couple the magnetic heads 7a—7d to the geophones a—d. The magnetic heads 7a—7d are mounted to overlie the individual channels of a magnetic tape 40 wrapped around the periphery of one section of a rotary drum 41, so as to record on these channels the geophone signals or to reproduce from these channels previously recorded signals. The magnetic heads have their recording-playback gaps in precise alignment transversely across tape 40 so as to accurately maintain the proper time relationship among the input signals supplied to the magnetic heads. The frequency modulated outputs from the multi-vibrator-type modulators 5a, 5b, etc., as amplified by the amplifiers 6a, 6b, etc., produce signals at the magnetic heads 7a, 7b, etc., which saturate the magnetic tape 40, thereby obliterating any previous recording thereon.

The coils of the magnetic heads are also connected through lines 8a, 8b, 8c, and 8d to fixed contact terminals 9a, 9b, 9c, 9d which are positioned to be engaged individually in succession by a mobile contact 10. The mobile contact 10 is connected electrically to the coil of a pen motor 145 through an amplifier-limiter 11, a frequency demodulator 12, a series of filters 13, a reproducing amplifier 14, and normally closed switch S–8B. The power supply for the amplifier-limiter 11, the frequency demodulator 12 and the amplifier 14 is from power supply 4 through the normally closed contacts 102, 200 of relay K–5. Thus, when relay K–5 is de-energized these components in the circuit from the mobile switch contact 10 to the pen motor 145 are energized and the circuit is effective to impart a signal to the pen motor. When relay K–5 is energized, it disconnects its mobile contact 102 from the fixed contact 200 and thereby de-energizes the input circuit to pen motor 145 so as to render the pen motor inactive.

The pen motor 145 carries a pen stylus 149 which overlies a record paper 146 wrapped around the periphery of drum 41. The pen motor actuates the pen stylus to move across the record paper in accordance with the signals applied to the pen motor from the magnetic head electrically connected to it at that time. The particular magnetic head which is connected to the pen motor is determined by the position of the mobile switch contact 10. The housing of pen motor 145 and the mobile switch contact 10 are mounted to move in unison axially across the record paper 146 from one channel to the next, as described in detail hereinafter, so that the switch contact is connected successively to the fixed contacts 9a, 9b, 9c, 9d to connect the pen motor successively to the magnetic heads 7a, 7b, 7c, 7d as the pen motor is indexed to successive channels axially across the record paper 146. Desirably the pen motor 145 may be constructed in accordance with U. S. Letters Patent No. 2,478,329 to H. B. Shaper.

In the overall operation of this system, the details of which are elaborated upon hereinafter, the drum 41 is caused to rotate clockwise in Fig. 1 and the relay K–5 is energized to close its mobile contact 102 against the fixed contact 103, thereby energizing the amplifiers 6a—6d in the circuits from the geophones a, b, c, d, to the magnetic recording and reproducing heads 7a, 7b, 7c, 7d. When the pin 79 carried by drum 41 actuates switch S–1 this completes a circuit through relay K–4 to fire the explosive 1.

As the drum continues to rotate following the explosion, the signals picked up by the geophones are fed to the magnetic heads 7a—7d, which make individual channel recordings simultaneously on the magnetic tape 40 on the drum.

After the drum has completed one full revolution following the explosion, the relay K–5 is de-energized, breaking the power supply circuits for the amplifiers 6a—6d leading from the geophones to the magnetic heads and completing the power supply circuits for the circuit elements 11, 12, and 14 in the circuit from the magnetic heads to the pen motor 145. During successive drum revolutions, the mobile switch contact 10 engages the fixed contacts 9a—9d in succession to connect the magnetic heads 7a—7d individually in succession to the pen motor 145. Each magnetic head reproduces the magnetic signal previously recorded on its channel of the magnetic tape 40 and supplies this reproduced signal to the pen motor 145 to actuate the pen stylus 149 in accordance with such signal. In these successive drum revolutions the pen motor 145, as well as the mobile switch contact 10, is shifted axially to the right to position the pen stylus 149 successively at the different channels on the record paper 146.

Structural arrangement at the recorder

With the general outline of the present invention being kept in mind, reference is now made to the specific details of the illustrated mechanism for accomplishing the purposes of this invention.

Figure 2:
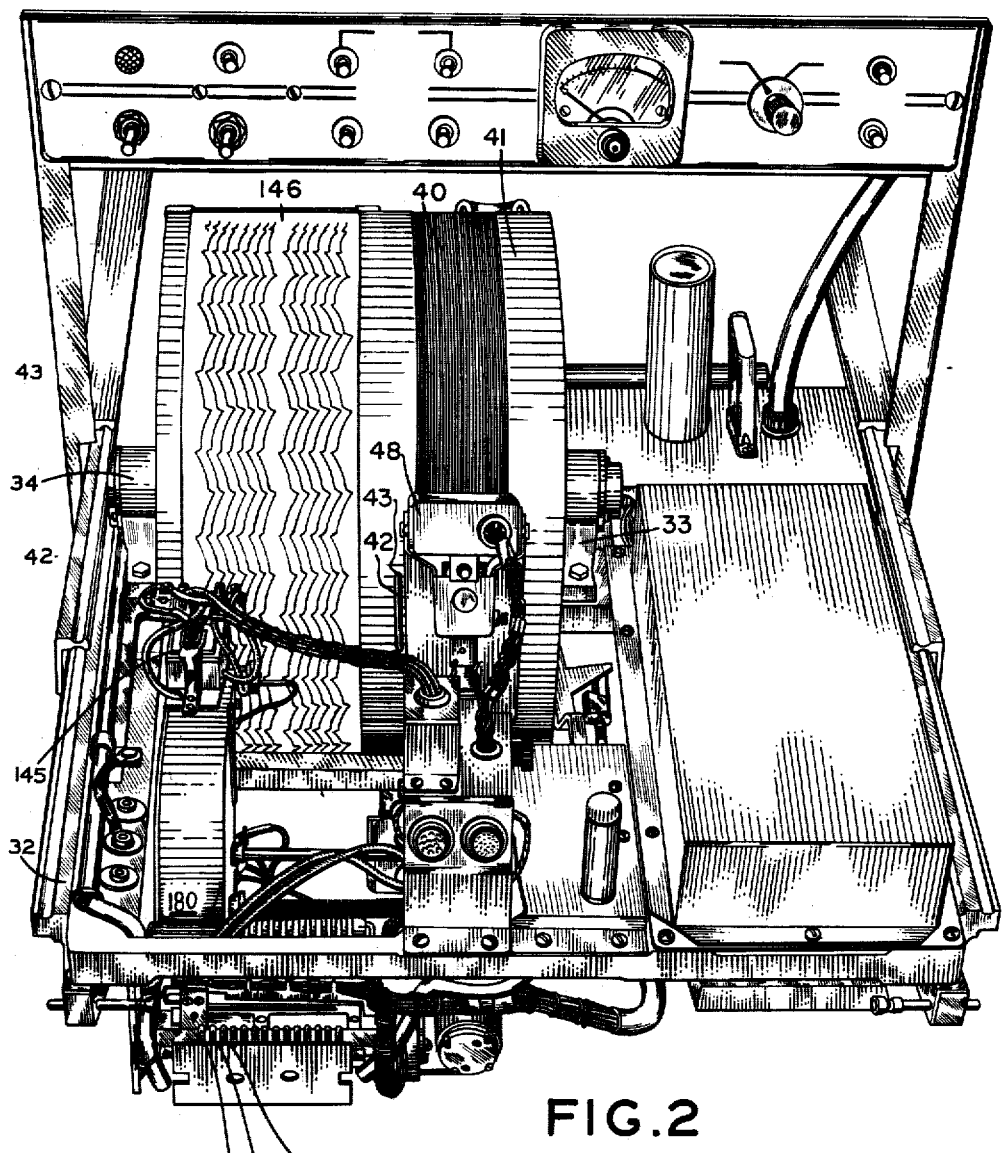
Figure 2 is a perspective view showing the recording drum and associated components of the present apparatus, looking down on the drum from the front thereof.
Figure 3:
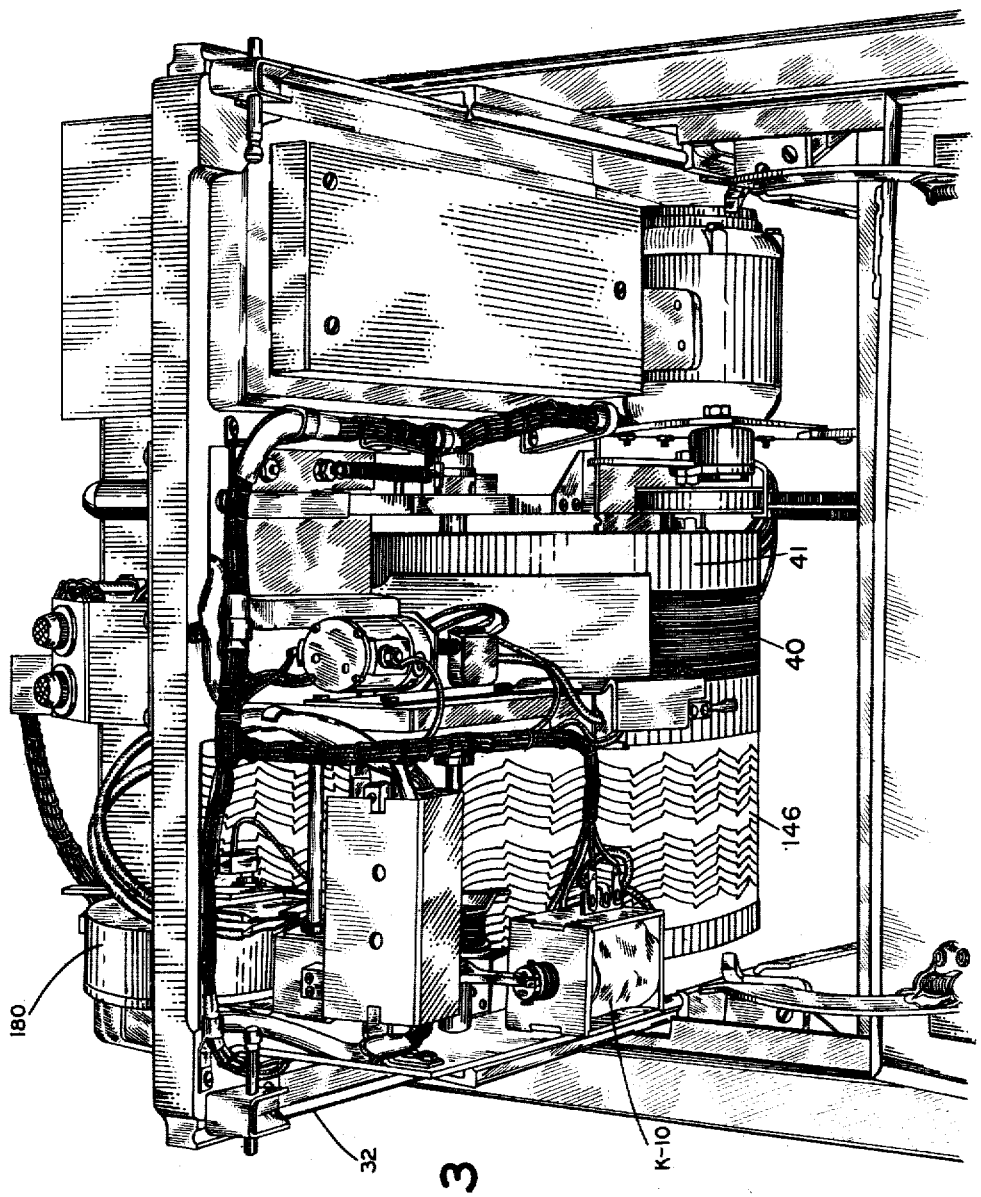
Figure 3 is a perspective view of the mechanism shown in Fig. 2, viewed from below the drum at the front thereof.
Figure 4:
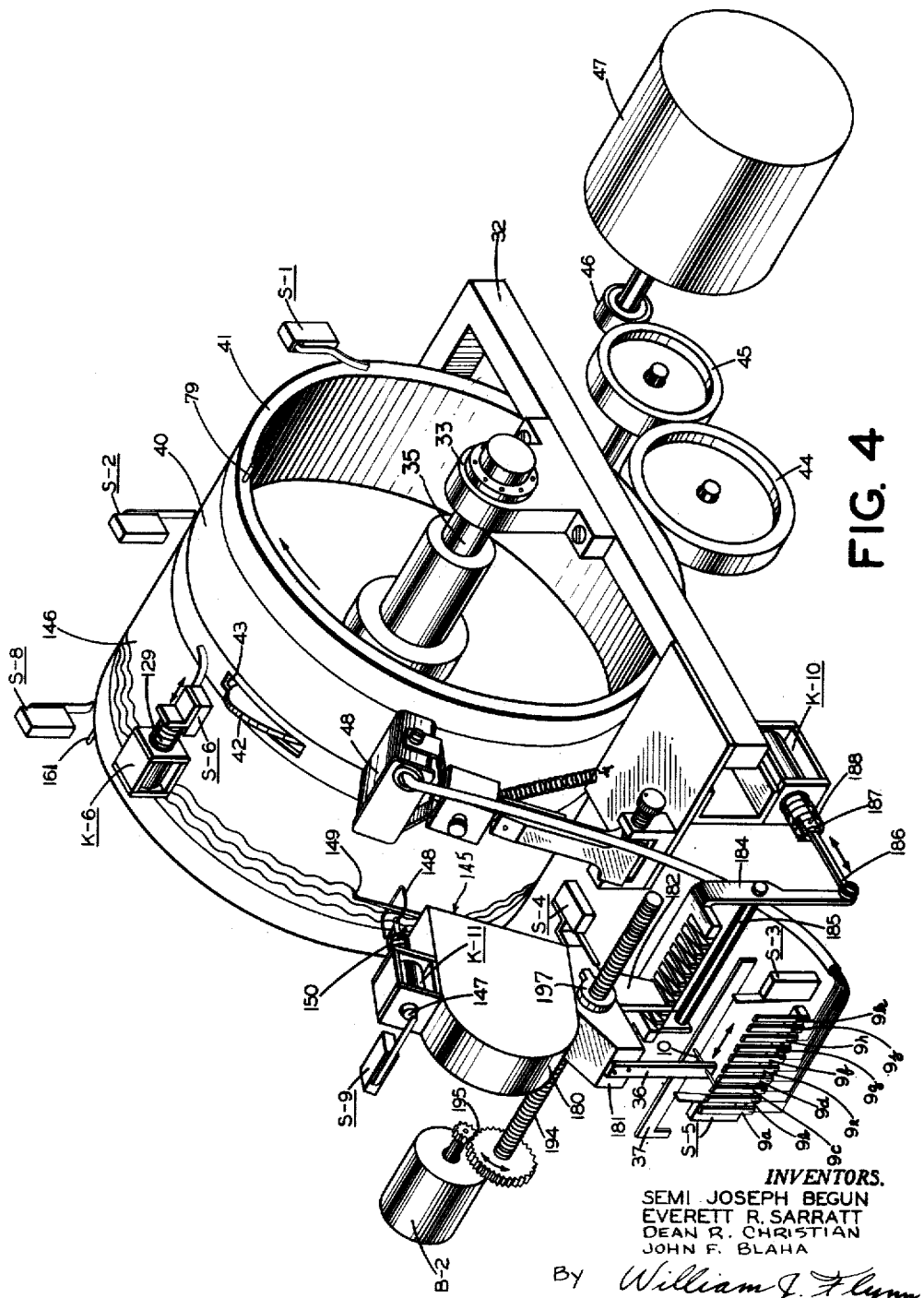
Figure 4 is a schematic perspective view of the recording drum mechanism and the associated controls in the present invention.

Referring to Figs. 2–4, the drum 41 is cut away to form a shallow, relatively wide, annular groove for snugly receiving the magnetic tape 40. The several magnetic recording and reproducing heads, corresponding in number to the number of geophones used, are enclosed in a common housing 48 so that the recording-playback gap of each head overlies one of the channels on the magnetic tape. Preferably, a resilient backing of rubber underlies the magnetic tape 40 on the drum to maintain the tape in contact with the heads as the drum rotates.

The drum 41 is supported for rotation by a rigid frame 32 which carries upstanding bearing blocks 33, 34 which rotatably support opposite ends of the shaft 35 on which the drum is mounted.

The drum is rotated through a speed reduction friction drive 44—46 from an electric motor 47. In one practical embodiment the drum turns at a speed of 12 revolutions per minute, so that one revolution of the drum is completed in five seconds. This period, therefore, is the time interval during which, after the explosion is initiated, the reflections picked up by the geophones are recorded magnetically.

At the other side of the drum it is cut away to provide a shallow, wide, annular groove for receiving the pen record paper 146. In this instance, this paper is of the so-called "Teledeltos" type and the pen stylus 149 is designed to burn a record line into the paper by an electric spark discharge from the pen stylus through the paper to the drum 41, which is grounded.

The pen stylus 149 is connected to a pen motor, indicated generally at 145, enclosed within a housing 180 mounted on a carriage 181, which is threadedly mounted on a rotary screw shaft 194 driven through speed reduction gearing 195 from an indexing motor B-2 of the permanent magnet type. The pen motor carriage 181 carries a depending finger 182 adapted to be locked in place by a slotted locking member 184 controlled by a solenoid K-10 mounted on the underside of the frame 32. In the operation of this mechanism, after the geophone signals have been recorded magnetically the pen motor and the pen stylus 149 are indexed successively to the right after each successive drum revolution, with the depending finger 182 on the pen motor carriage being locked in successive notches in the locking member 184 during these successive drum revolutions to position the pen stylus at successive recording channels transversely across the record paper 146. A limit switch S-4 mounted rigidly on the pen motor carriage 181 is adapted to control the indexing of the pen motor and the pen stylus between its successive positions in the manner described in detail hereinafter.

The pen motor carriage 181 also carries a depending arm 36 which supports the movable switch contact 10, mentioned above in the discussion of Fig. 1. At its back side the mobile switch contact 10 is continuously in engagement with an elongated contact terminal 37 leading to the amplifier-limiter 11 in Fig. 1, this amplifier-limiter, as well as the other components in the input circuit to the pen motor, being omitted in Fig. 4 for clarity of illustration. At its front side the movable switch contact 10 is adapted to engage in succession the separate fixed terminals 9a, 9b, 9c, etc., which are connected to the respective magnetic recording and reproducing heads, as pointed out in the discussion on Fig. 1.

A pair of limit switches S-3 and S-5 are positioned to be actuated in either extreme limit of movement of the pen motor carriage, so as to reverse the direction of the indexing motor B-2, as described in greater detail hereinafter.

Mounted on the housing 180 for the pen motor of the pen recorder, indicated generally at 145, is a solenoid K-11 which has a retractable armature 147 carrying at its outer end a yoke 148 extending around the pen stylus 149. A coil spring 150 biases the armature 147 away from the record paper on the drum. When solenoid K-11 is energized, the yoke 148 permits the pen stylus 149 to engage the paper 146. However, when K-11 is de-energized the armature 147 and yoke 148 are retracted by spring 150, lifting the pen stylus 149 off the paper.

At the middle of the periphery of drum 41 there is formed a slot 43 at which a retractable drum interlock lever 42 is located. This drum interlock lever is adapted to actuate a switch S-2 at one instant in each rotation of the drum. Another switch S-6 is mounted on the armature 129 of a solenoid K-6, and when this solenoid is energized switch S-6 is positioned to be actuated by the drum interlock lever 42 at a different instant in the rotation of the drum.

*Control circuit operation*

The drum motor 47 receives its energization from a power amplifier (not shown) which is energized from a 12 volt battery 50 (Fig. 7) through a ganged pair of manually actuated switches S-1B and S-2B.

Referring to Fig. 4, when a new section of the magnetic tape 40 is wound around the periphery of drum 41 the drum interlock lever 42 is positioned to project beyond the periphery of the drum.

Figure 7:
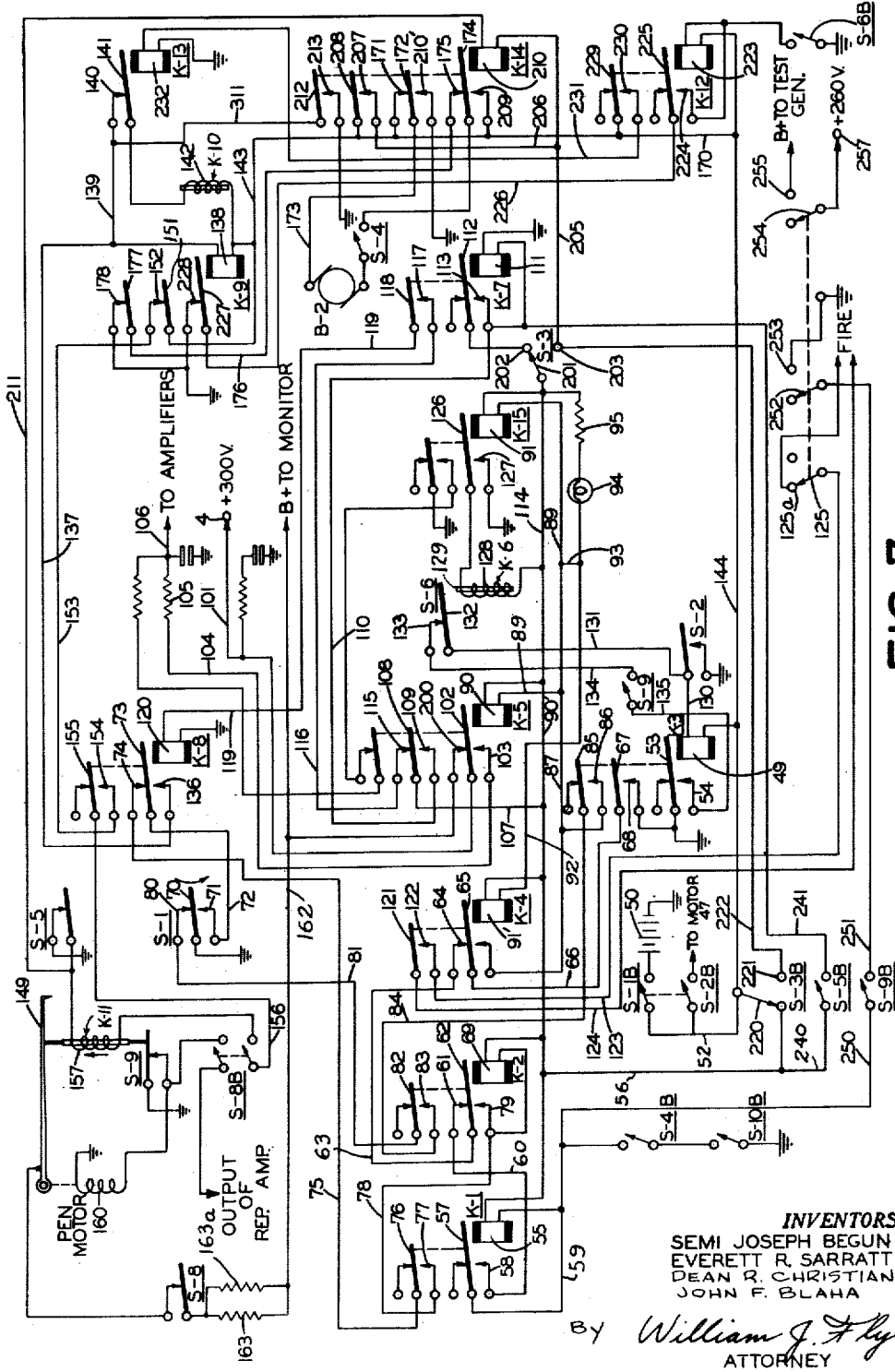
Figure 7 is a schematic diagram of the control circuit in the present invention.

*First drum rotation — Magnetic recording.*—When switches S-1B and S-2B are closed, drum motor 47 is energized and the drum 41 begins to rotate. As drum 41 rotates the drum interlock lever 42 momentarily closes switch S-2. This initiates the explosion and the magnetic recording operation as follows:

From the circuit diagram in Fig. 7 it will be apparent that this closing of switch S-2 completes an energization circuit for the coil 49 of relay K-3 as follows: from the 12 volt battery 50 through the main switch S-1B, line 52, K-3 relay coil 49, line 130 and switch S-2 to ground. When energized, the K-3 relay coil 49 actuates the associated movable contact 53 to engage the lower fixed contact 54, thereby completing a holding circuit for relay K-3 through switches S-6 and S-9, which are connected in series with each other between relay coil 49 and ground. This holding circuit for relay K-3 extends from battery 50 through switch S-1B, line 52, the K-3 relay coil 49, lines 130 and 131, switch S-6, line 134, switch S-9, line 135 and the K-3 relay contacts 54, 53 to ground. Switch S-6 is normally closed and is adapted to be positioned (by solenoid K-6) to be actuated momentarily to open position by the drum interlock lever 42 at a later time in the rotation of the drum. Switch S-9 also is normally closed. This latter switch is associated with the magnetic recording and reproducing head assembly so as to be closed when the magnetic heads are positioned next to the tape 40 for recording or reproducing and to be open when the magnetic heads are out of recording position, as during installation or servicing of the equipment.

The "fire" switches S-4B and S-10B are closed manually by the operator of the equipment to set up an energization circuit for the coil 55 of relay K-1 from battery 50 through the main on-off switch S-1B, normally closed reset switch S-3B and line 56. The K-1 relay coil 55 when energized actuates the movable relay contact 57 into engagement with the lower fixed contact 58, thereby setting up a holding circuit for the K-1 relay coil 55 as follows: from the battery 50 to the high side of the K-1 relay coil 55 as just described, and from the low side of the K-1 relay coil 55 through line 59, K-1 relay contacts 57, 58, line 60, the normally closed contacts 61 and 62 of relay K-2, line 63, the normally closed contacts 64 and 65 of relay K-4, line 66, and the normally open K-3 relay contacts 67 and 68 (relay K-3 being energized at this time).

Due to the energization of relay K-1 by the closing of the "fire" switches S-4B and S-10B, when relay K-3 is energized by the closing of drum switch S-2, the drum switch S-1 is connected to the coil 69 of relay K-2 through the following circuit: from the normally open contacts 70 and 71 of switch S-1, line 72, the normally closed contacts 73 and 74 of relay K-8 (which at this time is de-energized), line 75, the normally open K-1 relay contacts 76, 77 (relay K-1 being energized), and line 78 to coil 69 of relay K-2. As seen in Fig. 4, switch S-1 is positioned to be actuated momentarily by a pin 79 carried on the drum 41 once each revolution of the drum. When switch S-1 is thus actuated it completes an energization circuit for the K-2 relay coil 69 as follows: from battery 50 through switch S-1B, the normally closed reset switch S-3B, line 56, the K-2 relay coil 69, line 78, the K-1 relay contacts 77, 76, line 75, the K-8 relay contacts 74, 73, line 72, and the S-1 contacts 71, 70 to ground.

Relay K-2, when energized in this manner, in turn de-energizes relay K-1. Thus, when the above-described energization circuit for the K-2 relay coil 69 is completed, the K-2 relay contact 62 is moved out of engagement with upper fixed contact 61, thereby interrupting the energization circuit for relay K-1, and into engagement with the lower fixed contact 79. This completes a temporary holding circuit for K-2 by way of battery 50, switch S-1B, reset switch S-3B, line 56, the K-2 relay coil 69, the K-2 relay contacts 79, 62, line 63, the normally closed K-4 relay contacts 64, 65, line 66, and the K-3 relay contacts 67, 68 to ground.

After having been actuated momentarily by the drum pin 79, switch S-1 returns to its normal position in which its movable contact 70 engages the upper fixed contact 80. This completes energization circuits for relays K-5, K-15, and K-4 as follows: from the closed contacts 70 (grounded) and 80 of switch S-1 through line 81, movable contact 82 and lower fixed contact 83 of relay K-2

(which is energized at this time), line 84, movable contact 85 and lower fixed contact 86 of relay K–3 (which is energized), line 87, the parallel lines 88 and 89 to the low sides of the respective coils 90 and 91 of relays K–5 and K–15. The high sides of these relay coils are connected through line 90' to line 56 and thence through reset switch S–3B and the power switch S–1B to the battery 50. Relay coil 91' of relay K–4 also has its high side connected through line 90' to the battery. The low side of the K–4 relay coil 91' is connected through lines 92 and 93 to line 89 which leads to switch S–1. An indicator lamp 94 and a resistance 95 are connected in series with each other across the K–4 relay coil 91', so that whenever relay K–4 is energized the lamp 94 will be lighted.

When relay K–5 is energized, as above described, it establishes a connection from power supply 4 to the amplifiers 6a, 6b, etc. (Fig. 1), connected in the circuits from the geophones to the magnetic recording and reproducing heads, as follows: from the power supply 4 through line 101 to the K–5 movable relay contact 102, which engages the lower fixed contact 103 due to the energization of the K–5 relay coil 90. From the K–5 relay contact 103 the circuit extends through line 104 and a 1000 ohm resistor 105 to the line 106 connected to the amplifiers, as shown in Fig. 1.

In addition, the energization of relay K–5 results in the energization of relay K–7, which in turn sets up a circuit for energizing relay K–8 when relay K–5 next is de-energized. Thus, from the line 90', connected to battery 50 as described, the line 107 extends to the movable contact 108 of relay K–5 which, due to the energization of this relay, engages the lower fixed contact 109 which is connected through line 110 to the high side of coil 111 of relay K–7. Relay K–7 when energized completes a holding circuit for itself through its movable contact 112 and fixed contact 113 by way of the normally closed contacts 202, 201 of the pen motor carriage limit switch S–3, which is connected by line 114 to line 90'. The energization of relay K–7 also sets up a circuit for energizing relay K–8 when relay K–5 is de-energized, this circuit extending from the upper fixed contact 115 of relay K–5, line 116, lower fixed contact 117 of relay K–7 and the movable contact 118 which engages it while K–7 is energized, and line 119 to the coil 120 of relay K–8.

With the "fire" switches S–4B and S–10B having been closed, the energization of relay K–4 in response to actuation of drum switch S–1, as described, results in the firing of the explosive charge by virtue of the closing of the K–4 movable contact 121 on the fixed contact 122, these contacts being connected by lines 123 and 124, respectively, to the charge. A manual switch 125, 125a is interposed in line 123. Relay K–4 is a slow operating relay having a 1/10 second time delay before completing the firing circuit after switch S–1 has returned to its normal position after being momentarily actuated. During this time interval the relay K–5 will have completed the connection (102, 103) of the power supply 4 to the magnetic recorder amplifiers.

K–4, when energized, also de-energizes relay K–2, as follows: the K–4 movable contact 65 moves away from the upper fixed contact 64, thereby breaking the above-described holding circuit for relay K–2 through these K–4 contacts.

When energized by the momentary actuation and immediate release of drum switch S–1, relay K–15 energizes solenoid K–6 in the following manner: the K–15 movable contact 126 is actuated into engagement with the grounded fixed relay contact 127, thus completing the energization circuit for the K–6 solenoid coil 128 from line 90', which is connected through line 56, the reset switch S–3B, and power switch S–1B to battery 50.

Solenoid K–6 (Fig. 4) when energized in this manner moves its armature 129 to position the switch S–6 in the path of movement of the drum interlock lever 42, which previously had actuated switch S–2.

*Completion of magnetic recording interval*

To complete the magnetic recording interval (five seconds after the explosive is fired), the drum interlock lever 42 engages and opens switch S–6, de-energizing relay K–3, which in turn de-energizes relays K–4, K–5, and K–15. Thus, the low side of K–3 relay coil 49 is connected through lines 130 and 131 to the movable contact 132 of switch S–6, the fixed contact 133 of switch S–6 being connected through line 134, switch S–9, line 135, and K–3 relay contacts 54, 53 to ground. It will be recalled that the energization circuit for each of relays, K–4, K–5 and K–15 extends through the normally open K–3 relay contacts 85, 86, which open upon de-energization of the K–3 relay coil 49.

The de-energization of relay K–15 causes solenoid K–6 to be de-energized, so that switch S–6 after having been actuated open by the drum interlock lever 42 is moved out of the latter's path. However, since relay K–15 has a slow release action, this return of switch S–6 to its out-of-the-way position does not occur until after it has been actuated fully open.

When the drum interlock lever 42 strikes switch S–6, as described, this lever is pivoted, by means of a toggle (not shown), back inside the drum, so that it no longer projects beyond the drum periphery. Therefore, on successive revolutions of the drum, the switches S–2 and S–6 are not actuated. Because of this, it is not possible during these subsequent drum revolutions to again energize relay K–3, making it impossible to fire another explosive inadvertently and ruin the original recording.

*Playback of magnetically recorded signals to pen recorder.*—The de-energization of relay K–5 at the end of the magnetic recording interval (by the closing of switch S–6) causes its mobile contact 102 to return to its normal position engaging the upper fixed contact 200, thereby connecting the battery 4 to the amplifier-limiter 11, the demodulator 12 and the amplifier 14 in the pen motor circuit (Fig. 1). Therefore, such de-energization of relay K–5 results in the energization of these components in the pen motor circuit, as well as de-energizing the amplifiers 6a . . . in the circuits from the geophones to the magnetic heads.

Figure 5:
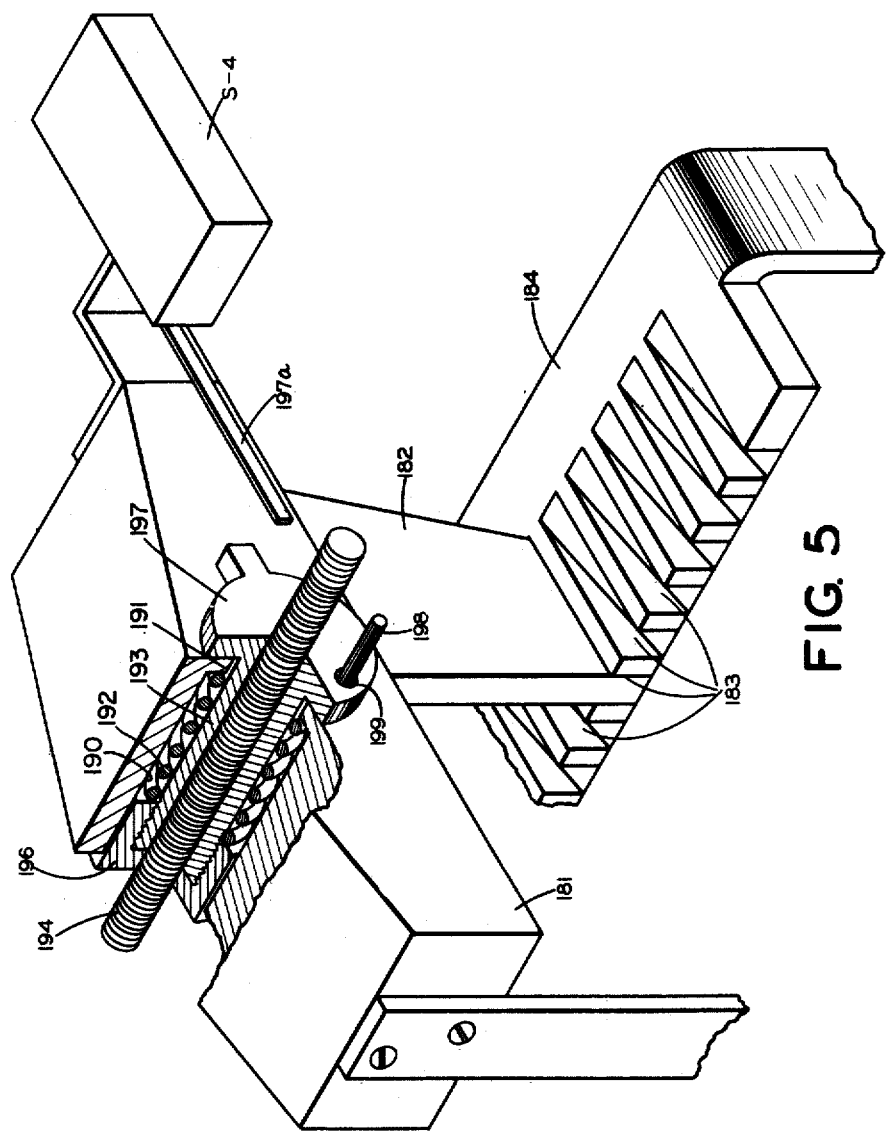
Figure 5 is fragmentary perspective, with parts broken away, showing the mechanism for indexing the pen recorder in the present assembly from one channel to the next to reproduce as visual pen tracings the magnetically recorded geophone signals.
Figure 6:
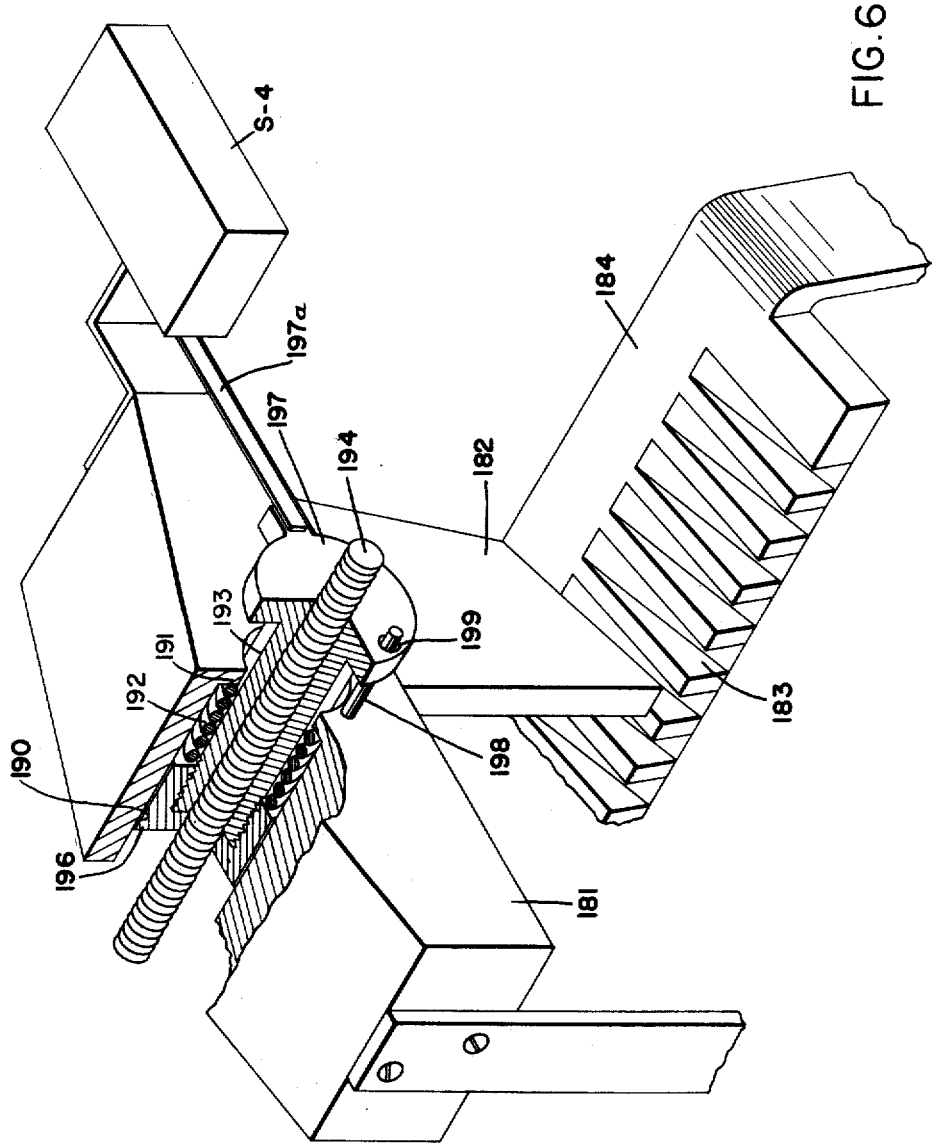
Figure 6 is a view similar to Fig. 5, with the mechanism operating at a different instant in the cycle of operation from that in Fig. 5.

The de-energization of relay K–5 at the end of the magnetic recording interval results in the energization of relay K–8 by way of the energization circuit set up by relay K–7, described hereinabove. The energization of relay K–8 in this manner disconnects switch S–1 from the K–1 relay contacts and connects this switch to the K–9 relay coil and the K–10 solenoid coil. Thus, the lower fixed contact 71 of switch S–1 is connected through line 72 to the K–8 movable contact 73, which contacts the lower fixed relay contact 136 due to the energization of K–8 relay coil 120. Contact 136 is connected through line 137 to the K–9 relay coil 138 and from line 137 through line 139 and the K–13 normally closed relay contacts 140, 141 to the K–10 solenoid coil 142. The opposite terminals of coils 138 and 142 are connected through lines 143, 170 and 144 to line 52 leading to battery 50. The K–10 solenoid controls the indexing of the pen recorder 145 (Fig. 4) between successive channels of the record paper 146, as follows:

*Pen recorder indexing.*—In accordance with the present invention, there is provided mechanism for shifting the pen stylus 149 successively to the right in Fig. 4 after each revolution of the drum following the magnetic recording interval, so as to make spaced individual pen recordings on the paper 146 which correspond to the geophone signals previously recorded on the respective channels on the magnetic record 40. For this purpose, the pen stylus 149 is connected to a pen motor 145 mounted within a housing 180. The pen motor housing 180 is supported rigidly by a carriage 181 (Figs. 4, 5 and 6). Carriage 181 carries a depending finger 182 adapted to be received successively in slots 183 formed in the upper face of a pivoted locking member 184. Referring to Fig. 4, locking member 184 is mounted pivotally on a fixed rod 185 and at its lower end has a pivotal connection to an extension rod 186 connected rigidly to the armature 187 of solenoid K–10. Normally, a coil spring 188 biases the armature to its extended position, tending to pivot the locking member 184 counter-clockwise in Figs. 4–6 into engagement with the finger 182 which depends from the pen motor carriage 181. However, when solenoid K–10 is energized it retracts the armature 187, pivoting the locking member 184 clockwise to release it from finger 182.

Referring now to Figs. 5 and 6, the carriage 181 is formed with a passage 190 presenting an annular inturned shoulder 191 at its right end against which one end of a helical spring 192 bears. This spring loosely encircles a hub 193, which is loosely received in the passage 190 and which is threadedly mounted on a threaded shaft 194 driven by the indexing motor B–2 through a reduction gearing 195 (Fig. 4). A nut 196, which is loosely received in the passage 190, is threaded onto the left end of hub 193 and engages the opposite end of coil spring 192. At its right end the hub 193 is formed with an enlarged head 197 disposed to the right of the pen motor base 181 and adapted to engage the operator 197a of limit switch S–4. A pin 198 projects from the right end of pen motor carriage 181 into a hole 199 in the hub head 197 to insure that the hub does not rotate in unison with shaft 194.

In the operation of this mechanism, assume that initially the pen motor carriage 181 is locked against movement by virtue of the reception of its depending finger 182 in one of the slots 183 in the locking member 184, as shown in Fig. 5. The indexing motor B–2 is energized and drives screw 194 in a direction to advance the unitary assembly of hub 193 and nut 196 to the right in Figs. 4–6. Such movement of nut 196 compresses the coil spring 192, whose other end bears against shoulder 191 on the now-stationary pen motor carriage 181.

After the screw 194 has advanced the hub 193 to the right a distance corresponding to the spacing between two adjacent slots 183 on the locking member 184, the enlarged head 197 on the hub engages the operator 197a of switch S–4, de-energizing the indexing motor B–2 temporarily. The energization circuit for motor B–2 (Fig. 7) extends from battery 50 through power switch S–1B, lines 52, 144 and 170, the normally closed K–14 relay contacts 171, 172, the field coil of motor B2, switch S–4, the normally closed K–14 relay contacts 174, 175, line 176, and the normally closed K–9 relay contacts 177, 178. When the motor B–2 is thus deenergized, screw 194 ceases to turn, hub 193 is stationary with its enlarged head 197 engaging the S–4 switch operator to maintain switch S–4 open, and the coil spring 192 is compressed tightly.

When next the drum switch S–1 is closed momentarily, the solenoid K–10 is energized momentarily, disengaging the locking member 184 from engagement with the depending finger 182 attached to pen motor carriage 181, as shown in Fig. 6. Accordingly, the pen motor carriage 181 is free to move to the right, which it does substantially instantaneously under the urging of the compressed spring 192. The movement of pen motor carriage 181 to the right in Fig. 6 is limited by the position of the hub head 197 on the now-stationary screw 194 and the parts are so proportioned that such movement of the pen motor carriage is through a distance exactly equal to the spacing between adjacent slots 183 on the locking member 184. The energization of solenoid K–10 by the actuation of drum switch S–1 is through the following circuit: from battery 50 through power switch S–1B, lines 52, 144, 170 and 143, through the K–10 solenoid coil 142, the normally closed K–13 relay contacts 141, 140, lines 139 and 137, the K–8 relay contacts 136, 73 (K–8 being energized at this time), line 72 and the S–1 contacts 71, 70 to ground.

Therefore, after having been shifted to the right in this manner, the pen motor base 181 has its depending finger 182 positioned to engage in the next slot 183 in the locking member 184 when the latter returns to its normal position under the influence of spring 188, with solenoid K–10 no longer energized. In this new position of the pen carriage, the limit switch S–4 has also been displaced to the right, so that its operator 197a is no longer engaged by the enlarged head 197 on hub 193. Therefore, switch S–4 closes and motor B–2 is again energized, driving screw 194 to advance the hub 193 again to the right, compressing spring 192, until it again opens switch S–4 to de-energize motor B–2. Then, when the drum switch S–1 is again actuated (on the next drum revolution) the pen motor carriage is again indexed one notch to the right.

Thus, on successive revolutions of drum 40 with this arrangement the entire pen motor assembly, including the pen 149, is indexed successively to the right for producing individual record tracks on the paper 146.

*Momentary de-activation of recording pen once each drum revolution following the magnetic recording interval.*—The energization circuit for the solenoid K–11, which normally maintains the pen stylus 149 in contact with the paper 146, is from battery 50 by way of power switch S–1B, lines 52, 144, and 143, the normally closed contacts 151, 152 of relay K–9, line 153, the normally open contacts 154, 155 of relay K–8, line 156, pen motor switch S–8B to the high side of the K–11 solenoid coil 157, and from the low side of this solenoid coil through limit switch S–5 to ground. Thus, with relay K–8 energized and relay K–9 de-energized, solenoid K–11 is normally energized. When switch S–1 is closed momentarily each revolution of drum 41 following the magnetic recording interval, it momentarily energizes relay K–9 thereby momentarily de-energizing solenoid K–11, so that the recording pen 149 is lifted off the paper 146 momentarily once each such drum revolution. In one embodiment of the present invention, this pen lifting action takes place at the instant when a break in the record paper 146 passes beneath the pen stylus 149. Such break in the record paper appears at a transverse slit in the drum periphery through which the record paper extends from storage and takeup reels inside the drum in the particular construction described and claimed in the copending application of S. J. Begun et al., Serial No. 403,412, filed January 11, 1954, and assigned to the same assignee as the present invention.

In addition, from Fig. 4 it will be apparent that the normally open switch S–9 is positioned behind solenoid K–11 so that when the latter is de-energized momentarily, the resulting retraction of armature 147 closes switch S–9, short circuiting the coil 160 of the pen motor, so that the pen motor is de-energized. The circuit for the pen motor (Fig. 1) is from the magnetic recording and reproducing heads through the amplifier-limiter 11, frequency demodulator 12, filters 13 and reproducing amplifier 14 to switch S–8B and thence through the pen motor coil 160 to ground, as is apparent from Fig. 7. Therefore, during the time that the pen stylus 149 is lifted off the paper it is not being actuated by the pen motor.

Simultaneously with the momentary de-energization of solenoid K–11, the normally closed switch S–8 is actuated to open position by a pin 161 on drum 41. This switch, when closed, completes a circuit from the power supply 4 through the K–5 relay contacts 102 and 200, line 162 and parallel resistors 163, 163a to the pen stylus 149, so that at the tip of the pen stylus there is produced a spark which penetrates through the paper 146 to the grounded drum, the pen tracing being made in this way. Thus, when the pen 149 is momentarily lifted away from the paper its spark circuit is also momentarily interrupted so that there can be no spark at this time.

Relay K–9 controls the energization of motor B–2, which indexes the pen motor to successive positions corresponding to the individual channels on paper 146. Thus, the energization circuit for indexing motor B–2 is from battery 50 through lines 52, 144, and 170 to the upper fixed contact 171 of relay K–14, the K–14 movable relay contact 172, line 173 to one side of the field coil of motor B–2, from the other side of the B–2 motor field coil through switch S–4 to the K–14 relay movable contact 174, the upper fixed contact 175, line 176, the K–9 relay movable contact 177 and the upper fixed contact 178 to ground. When the K–9 relay coil 138 is energized it pulls movable contact 177 away from fixed contact 178, breaking the energization circuit for motor B–2. Therefore, while the pen 149 is lifted away from the paper 146 (as a result of the energization of relay K–9), the indexing motor B–2 is de-energized.

*Playback operation.*—With the foregoing arrangement, referring to Fig. 1, during the first drum revolution following the magnetic recording interval the first (7a) of the magnetic recording and reproducing heads is connected through line 8a, contact finger 9a, mobile contact 10, and the amplifier-limiter 11, frequency demodulator 12, filters 13, amplifier 14, and the normally closed switch S–8B to the pen motor 145. During this revolution the pen motor 145 is positioned to have its pen stylus 149 overlie the outermost channel on the record paper 146. The signal from the magnetic head 7a, after being demodulated in demodulator 12 to eliminate the carrier, is fed to the coil of the pen motor 145 to control the position of the pen stylus. At this time the pen stylus 149 is connected through switch S–8, line 162 and contacts 200 and 102 of relay K–5 to the 300 volt power supply 4, so that an electric discharge takes place at the pen stylus which burns a line into the record paper as the drum rotates. During this drum revolution, the indexing motor B–2 will have been energizd to compress the pen motor carriage spring 192, as described, until limit switch S–4 is opened, thereby interrupting the energization of motor B–2.

At the completion of this drum revolution the pin 79 carried by drum 41 momentarily closes switch S–1. When this happens, the following actions take place simultaneously: the solenoid K–10 is energized momentarily to retract the locking member 184, which enables the pen motor carriage to advance one notch to the right in Fig. 4 under the influence of the spring 192; the coil 160 of pen motor 145 is de-energized; the pen stylus 149 is lifted off the record paper 146.

With the pen motor assembly having been indexed one notch to the right, the pen stylus 149 now overlies the second channel of the record paper 146, and the movable switch contact 10 engages the next fixed terminal 9b so as to connect the next magnetic head 7b to the pen motor 145. Accordingly, during the following drum revolution, the pen recorder records a visual trace which represents the previously recorded signal at the second magnetic record channel.

The foregoing cycle is repeated in sequence until all of the magnetic record channel signals have been reproduced as visual pen tracings.

*Return to starting position.*—After the last channel has been reproduced on the record paper 146, the pen motor carriage 181 actuates the limit switch S–3 (Fig. 4) to reverse the direction of the indexing motor B–2, which reverses the screw 194 to return the pen motor carriage to the left in Fig. 4, back to the outer end of the drum. Thus, switch S–3 (Fig. 7) when thus actuated, has its mobile contact 201 moved away from the fixed contact 202 and into engagement with the fixed contact 203.

This actuation of switch S–3 momentarily energizes relay K–14 as follows: from battery 50 through the switches S–1B, S–3B, lines 56, 90′, and 114, the S–3 switch contacts 201, 203, line 205, through the coil 210 of relay K–14 and thence through line 211 and the normally closed limit switch S–5 to ground. When thus momentarily energized the relay K–14 sets up a holding circuit for itself through the now closed K–14 relay contacts 207, 208 as follows: from battery 50 through switch S–1B, lines 52, 144 and 170, K–14 relay contacts 208, 207, line 206, through the coil 210 of relay K–14, line 211 and the normally closed limit switch S–5 to ground. This energization of relay K–14 completes a reverse energization circuit for indexing motor B–2 as follows: from battery 50, through the switch S–1B, lines 52, 144, and 170, the K–14 relay contacts 209 and 174, switch S–4, through the field coil of index motor B–2 and thence through line 173 and the K–14 relay contacts 172, 210′ to ground. It will be noted that the current through this circuit to index motor B–2 is the reverse of its previous direction, so that the motor is reversed. Such reversal of motor B–2 causes the screw 194 to reverse its direction of rotation, thereby returning the pen motor carriage 181 to the left in Fig. 4.

The energization of relay K–14, in response to the actuation of limit switch S–3, as described, also energizes solenoid K–10 as follows: from battery 50 through switch S–1B, lines 52, 144, 170 and 143, through the coil 142 of solenoid K–10 and thence through the K–13 relay contacts 141, 140, line 311, and the K–14 relay contacts 212, 213 to ground. With solenoid K–10 energized, the locking member 184 is retracted out of the way of the depending finger 182 on the pen motor carriage 181, permitting the pen motor carriage to move to the left because of the reverse rotation of screw 194 driven from the indexing motor B–2.

The actuation of limit switch S–3 by the pen motor carriage also de-energizes relay K–7, which results in the de-energization of relay K–8. Thus, when the mobile contact 201 of switch S–3 disengages from fixed contact 202 it breaks the holding circuit through the K–7 relay contacts 112, 113 for the coil 111 of relay K–7. Due to the de-energization of the K–7 relay coil 111 the mobile contact 118 separates from the fixed contact 117 of this relay, thereby breaking the energization circuit for the K–8 relay coil 120.

With relay K–8 de-energized, the switch S–1 is ineffective to energize solenoid K–10 for indexing the pen motor assembly on successive revolutions of the drum. This condition prevails until relay K–8 is again energized.

At this time, with the indexing motor B–2 running in the reverse direction, the pen motor carriage moves to the left in Fig. 4 until it actuates the normally closed limit switch S–5. When this switch is opened in this manner, it de-energizes relay K–14 and K–9 and de-energizes solenoid K–10. Thus, the opening of switch S–5 breaks the ground return through line 211 for the K–14 relay coil 210. The de-energization of relay K–14 causes its mobile contact 212 to disengage from its fixed contact 213, thereby disconnecting the energization circuit through line 311 for the K–10 solenoid coil 142 and the K–9 relay coil 138.

As a result of this de-energization of relays K–9 and K–14, the indexing motor B–2 again reverses in direction, the energization circuit for this motor again being from battery 50 through switch S–1B, lines 52, 144 and 170, the normally closed K–14 relay contacts 171, 172, line 173, the field coil of motor B–2, switch S–4, the normally closed K–14 relay contacts 174, 175, line 176, and the normally closed K–9 relay contacts 177, 178, to ground. Accordingly, motor B–2 is now energized to run in its "forward" direction, tending to compress the coil spring 192 for indexing the pen motor carriage 181 to the right.

The de-energization of solenoid K–10 permits the locking member 184 to return to its position for locking the pen motor carriage in place. The depending finger 182 on the pen motor carriage is then received in the first notch 183 on the locking member 184.

The entire unit will be ready for another fire-record-reproduce cycle when a new section of magnetic tape and a new section of the "Teledeltos" paper are placed on drum 41 and the drum interlock lever 42 is actuated to project beyond the drum periphery.

*Auxiliary controls*

At any time during the fire-record-reproduce cycle the mechanism may be returned to its starting condition by actuating the manual reset switch S-3B. Such action de-energizes the relays K-1, K-2, K-4, and K-5 by disconnecting them from battery 50. At the same time, such actuation of reset switch S-3B energizes relay K-14 as follows: from battery 50 through switch S-1B, the mobile contact 220 and the fixed contact 221 of switch S-3B lines 222 and 205 to the K-14 relay coil 210, and from this coil through line 211 and switch S-5 to ground. Such energization of relay K-14 returns the entire mechanism to its starting position in the manner explained in detail above in the section on "Return to starting position."

At any time during the reproduction sequence (that is, the recording of pen tracings corresponding to the magnetic recordings) the reproduction of any one of the magnetic record channels may be repeated by actuating the repeat switch S-6B. Thus, when switch S-6B is closed it completes an energization circuit for relay K-12 as follows: from battery 50 through switches S-1B, lines 52 and 144 to the K-12 relay coil and thence through switch S-6B to ground. Such energization of the K-12 relay coil completes a holding circuit independent of switch S-6B for this relay as follows: from battery 50 through switch S-1B, lines 52 and 144, the K-12 relay coil, the normally open K-12 relay contacts 224, 225, line 226, the normally closed K-9 relay contacts 227, 228 to ground. As a result of the energization of relay K-12, a slow release relay K-13 is energized as follows: from battery 50 through switch S-1B, lines 52 and 144, the normally open K-12 relay contacts 229, 230, line 231, and through the K-13 relay coil 232 to ground. K-13, when energized in this manner, opens the contacts 140, 141, thereby breaking the energization circuit for solenoid K-10, so that the pen motor carriage 181 cannot be indexed to the next pen record channel when the drum switch S-1 is next actuated. When switch S-1 is next actuated it de-energizes relay K-12, breaking its holding circuit by energizing relay K-9. However, relay K-13, due to its time delay in opening, prevents the energization of solenoid K-10 during the brief instant that switch S-1 is closed. This action permits a repeat of the pen reproduction of the magnetic signal recorded at any particular channel.

Switch S-8 is open each revolution of the drum by the pin 161 carried by the drum. This disconnects the power supply 4 from the pen stylus 149 during the first 1/10 second of each reproducing interval so that unwanted transients do not appear on the pen record.

The normally open switch S-5B permits re-recording all of the channels from the magnetic tape to the "Teledeltos" paper at any time. Thus, when switch S-5B is closed it completes an energization circuit for relay K-7 as follows: from battery 50 through switches S-1B and S-3B, line 240, switch S-5B, line 241 and the K-7 relay coil 111 to ground. Such energization of relay K-7 sets up an energization circuit for relay K-8 which goes into effect the next time relay K-5 is de-energized by the opening of drum switch S-6 by the drum interlock lever 42 as the drum rotates. Such energization of relay K-8 initiates the visual recording of the magnetic tape signals on the record paper, as described in detail above.

In order to test the equipment, provision is made for recording a 4 cycle per second square wave test signal on the magnetic tape for subsequent reproduction by the pen recorder. To this end there is provided a normally open switch S-9B connected through line 250 in parallel with the "fire" switches S-4B and S-10B. Switch S-9B is connected through line 251 to a movable switch contact 252 adapted to be closed against a grounded fixed switch contact 253. The mobile switch contact 252 is ganged to move in unison with the mobile switch contact 125 in the explosion firing circuit. Thus, when switch 252, 253 is closed, switch 125, 125a in the "fire" circuit is opened. The movable switch contacts 125 and 252 are also ganged to another movable switch contact 254. When switch 252, 253 is closed, contact 254 engages the fixed switch contact 255 thereby supplying power from the 260 volt power supply terminal 257 to the square wave generator 256 (Fig. 1) to energize the square wave generator. From Fig. 1 it will be apparent that the square wave generator feeds into the input circuit to each magnetic recording and reproducing head.

In the foregoing system, the multichannel magnetic recording arrangement is capable of accurately recording as a permanent record the full frequency range of the seismic signals which are of practical importance, this range extending from 20 cycles per second or lower up to about 500 cycles per second. Afterwards, if desired, in the final analysis of these records any portions of this frequency range which are considered not significant for the determination of the oil or other mineral-bearing properties of the test location may be filtered out in the reproduction of the magnetic record. However, the entire signal frequency range is permanently preserved on the record for reproduction at any time as desired.

It will be noted that with the present invention, by virtue of the fact that the magnetic tape and the visual record chart are mounted on the same drum, there is maintained a predetermined fixed physical relationship between these records which avoids the introduction of phasing errors in reproducing from the magnetic tape onto the visual record chart, even though the magnetic record channels are thus reproduced sequentially.

The pen recorder 145 has a frequency response limited to below about 100 cycles per second, so that, if the drum speed is the same during playback as during the magnetic recording interval, the visual record does not reproduce fully the magnetically recorded signals, which may range in frequency up to about 500 cycles per second. However, this limitation in the frequency response of the pen recorder is not deleterious since this visual record is not used for a final analysis of the geophone signals, but rather is used merely as a quick check to see if the recording equipment was operating properly during the recording interval and to indicate whether the explosive "shot" exploded properly. If the pen record reproduction on chart 146, which is made immediately after the signal recording interval, indicates that such was the case then the operators of the equipment are assured that the recording was successful. An accurate visual reproduction of the magnetic record, and final analysis thereof, can be made at any time thereafter under conditions more conducive to such analysis since the magnetic record itself is permanent.

In the event that it is desired to have the pen recorder reproduce the full frequency range of the signals recorded magnetically, then the drum speed could during playback be reduced to 1/5 its speed during the magnetic recording interval. In the illustrated embodiment of the present invention, this could be accomplished by reducing the speed of drum motor 47 in response to actuation of switch S-6 at the end of the magnetic recording interval. Such a modified arrangement could be adopted where it is intended that the pen recording be more accurate than what is required for merely a spot check. It will be noted that in such modified arrangement there would not be introduced any timing errors among the several signal channels since the magnetic tape and the visual record chart would be on the same drum and moving at the same speed during the playback sequence following the magnetic recording interval.

Of particular advantage in the above-described arrangement of the present invention is the fact that only a single pen motor is used. Because of this only a single pen motor amplifier is needed, thus reducing the power requirements to a minimum. Also, due to the absence of other pen motors adjacent to it which would interfere with its motion, there is no limitation on the maximum amplitude of the pen stylus movement for that reason. Accordingly, it is possible to obtain a visual record in which strong amplitude signals in the different channels cross each other's path on the record chart.

From the foregoing description, it will be apparent that the apparatus disclosed in detail herein is particularly well adapted to accomplish the purposes of the present invention in an efficacious manner. However, it is to be understood that, while there has been disclosed herein a specific apparatus for accomplishing the objects of the present invention, various modifications, omissions and refinements which depart from the specific details of the present disclosure may be adopted without departing from the spirit and scope of this invention.

We claim:

1. Recording apparatus for geophysical prospecting comprising a plurality of magnetic recording and reproducing playback head means, a multichannel magnetic record mounted for movement past said magnetic head means during a magnetic recording interval for the simultaneous recording on said magnetic record of geophone signals to respective ones of the head means and for repeat movement past the magnetic head means following the magnetic recording interval for the reproduction of the magnetically recorded signals, pen recorder means, a multichannel visual record chart mounted for movement repeatedly past said pen recorder means following the magnetic recording interval, means for connecting said pen recorder means sequentially to individual ones of said magnetic head means upon successive repeat movements of said magnetic record and said visual record chart past said magnetic head means and said pen recorder means, respectively, to sequentially reproduce on said visual record chart the individual magnetic recordings at the respective channels on the magnetic record, and drive mechanism for moving said magnetic record and said visual record chart together in physical synchronism during said repeat movements thereof to maintain among the signal reproductions on the visual record chart at the several channels thereon the same time relationship as among the recorded signals at the several channels on the magnetic record.

2. Recording apparatus for geophysical prospecting, comprising a plurality of magnetic recording and reproducing heads, a multichannel magnetic record movable past said heads, a pen recorder, a multichannel visual record chart movable past said pen recorder, said magnetic record and said visual record chart being mounted for movement together in physical synchronism repeatedly past said magnetic heads and said pen recorder, respectively, means for supplying seismic signals to said magnetic heads as the magnetic record moves past said heads during a magnetic recording interval, means operative following the completion of the magnetic recording interval for moving said magnetic record and said visual record chart repeatedly past said magnetic heads and said pen recorder, respectively, means operative during the repeat movements of the magnetic record past the magnetic heads and the visual record chart past the pen recorder for electrically connecting the pen recorder in succession to the magnetic heads individually for reproduction by the pen recorder on the visual record chart of the individual magnetic recordings, and means operative upon said repeat movements of the magnetic record and the visual record chart to index the pen recorder successively from one channel to the next across the visual record chart.

3. Apparatus for recording a plurality of transient signals, comprising a plurality of magnetic recording and reproducing head means, a multichannel magnetic record mounted for movement past said magnetic head means during a magnetic recording interval for the simultaneous recording on said magnetic record of a plurality of transient signals to respective ones of the magnetic head means and for repeat movement past the magnetic head means following the magnetic recording interval for the reproduction of the magnetically recorded signals, pen recorder means, a multichannel visual record chart mounted for movement repeatedly past said pen recorder means following the magnetic recording interval, means for connecting said pen recorder means sequentially to individual ones of said magnetic head means upon successive repeat movements of said magnetic record and said visual record chart past said magnetic head means and said pen recorder means, respectively, to sequentially reproduce on said visual record chart the individual magnetic recordings at the respective channels on the magnetic record, and drive mechanism for moving said magnetic record and said visual record chart together in physical synchronism during said repeat movements thereof to maintain among the signal reproductions on the visual record chart at the several channels thereon the same time relationship as among the recorded signals at the several channels on the magnetic record.

4. Recording apparatus for geophysical exploration comprising, a plurality of magnetic recording and reproducing heads, a multichannel magnetic record means movable repeatedly past said heads, a plurality of geophone circuits adapted to be connected respectively to the magnetic heads, a pin recorder, a multichannel visual record chart movable repeatedly past said pen recorder in physical synchronism with the movement of said magnetic record means past the magnetic recording and reproducing heads, means rendering said input circuits operative to supply geophone signals to the magnetic heads as the magnetic record means moves past said heads for simultaneously recording magnetically the individual geophone signals during a magnetic recording interval, means operative following the magnetic recording interval to disconnect said input circuits from said magnetic heads, means operative following the magnetic recording interval to connect the magnetic heads in succession to the pen recorder as the magnetic record means again moves past the magnetic heads and the visual record chart moves past the pen recorder for reproducing the magnetic recordings in succession as visual pen recordings on said visual record chart which maintain the time relationship among the signals recorded magnetically, and means operative following the magnetic recording interval to index the pen recorder from one channel to the next across said visual record chart upon successive repeat movements of said magnetic record means and said visual record chart past the magnetic heads and the pen recorder, respectively.

5. Recording apparatus for geophysical prospecting, comprising a rotary drum unit, a plurality of magnetic recording and reproducing heads mounted to extend adjacent a portion of the periphery of the drum unit, a multichannel magnetic tape mounted on said portion of the periphery of the drum unit to move past said heads, a pen recorder positioned to extend adjacent another portion of the periphery of the drum unit, a multichannel visual record chart on said portion of the periphery of the drum unit movable past said pen recorder in physical synchronism with the movement of the magnetic tape past said magnetic heads, means for supplying geophone signals to said magnetic heads as the drum unit rotates to move the magnetic tape past the heads during a magnetic recording interval, means operative following the completion of the magnetic recording interval to rotate the drum unit repeatedly to move the magnetic tape repeatedly past the magnetic heads and to move the visual record chart repeatedly past the pen recorder, means operative during the successive rotations of the drum unit following the magnetic recording interval to electrically connect the pen recorder in succession to the magnetic heads individually for reproduction by the pen recorder on the visual record chart of the individual magnetic recordings on the magnetic tape, and means operative upon each successive rotation of the drum unit to index the pen recorder successively from one channel to the next across the visual record chart.

6. For use in geophysical exploration apparatus which includes a plurality of spaced geophones positioned to receive seismic signals following an explosion in the ground in the vicinity of the geophones, recording apparatus which comprises: a rotary drum unit, a plurality of magnetic recording and reproducing heads having record-playback gaps and mounted with their respective record-playback gaps in alignment transversely across a portion of the periphery of the drum unit, a multichannel magnetic tape mounted on said portion of the periphery of the drum unit to move past the record-playback gaps of the magnetic heads as the drum unit rotates, a pen recorder mounted to overlie another portion of the periphery of the drum unit, a multichannel record chart mounted on said other portion of the periphery of the drum unit to move past the pen recorder as the drum unit rotates, a plurality of input circuits adapted to be connected respectively between the geophones and the magnetic heads, means operative during rotation of the drum unit for conncting said input circuits to the magnetic heads to supply geophone signals thereto during a magnetic recording interval for the simultaneous recording magnetically of the geophone signals, means operative upon continued rotations of the drum unit to disconnect said input circuits from the magnetic heads, means operative during said continued rotations of the drum unit to connect the pen recorder electrically in succession to the magnetic heads individually to reproduce the individual magnetic channel recordings as individual pen tracings on the visual record chart, and means operative upon each successive rotation of the drum unit to index the pen recorder successively from one channel to the next across the visual record chart.

7. Recording apparatus comprising a plurality of magnetic recording and reproducing playback head means, a multichannel magnetic record mounted for movement past said magnetic head means during a magnetic recording interval for the simultaneous recording on said magnetic record of transient signals to respective ones of the magnetic head means and for repeat movement past the magnetic head means following the magnetic recording interval for the reproduction of the magnetically recorded signals, visual recorder means, a multichannel visual record medium mounted for movement repeatedly past said visual recorder means following the magnetic recording interval, means for connecting said visual recorder means sequentially to individual ones of said magnetic head means upon successive movements of said magnetic record and said visual record medium past said magnetic head means and said visual recorder means, respectively, to sequentially reproduce on said visual record medium the individual magnetic recordings at the respective channels on the magnetic record, and drive mechanism for moving said magnetic record and said visual record medium together in physical synchronism during said repeat movements thereof to maintain among the signal reproductions on the visual record medium at the several channels thereon the same time relationship as among the recorded signals at the several channels on the magnetic record.

8. Recording apparatus for geophysical prospecting comprising a plurality of magnetic recording and reproducing heads, a multichannel magnetic record movable past said heads, a visual recorder, a multichannel visual record medium movable past said visual recorder, said magnetic record and said visual record medium being mounted for movement together in physical synchronism repeatedly past said magnetic heads and said visual recorder, respectively, means for supplying seismic signals to said magnetic heads as the magnetic record moves past said heads during a magnetic recording interval, means operative following the completion of the magnetic recording interval for moving said magnetic record and said visual record medium repeatedly past said magnetic heads and said visual recorder, respectively, means operative during the repeat movements of the magnetic record past the magnetic heads and the visual record medium past the visual recorder for electrically connecting the visual recorder in succession to the magnetic heads individually for reproduction by the visual recorder on the visual record medium of the individual magnetic recordings, and means operative upon said repeat movements of the magnetic record and the visual record medium to index the visual recorder successively from one channel to the next across the visual record medium.

9. Recording apparatus for seismic prospecting comprising a rotary drum unit, a plurality of magnetic recording and reproducing heads mounted to extend adjacent a portion of the periphery of the drum unit, a multichannel magnetic tape mounted on said portion of the periphery of the drum unit to move past said heads, a visual recorder positioned to extend adjacent another portion of the periphery of the drum unit, a multichannel visual record medium on said other portion of the periphery of the drum unit movable past said visual recorder in physical synchronism with the movement of the magnetic tape past said magnetic heads, means for supplying seismic signals to said magnetic heads as the drum unit rotates to move the magnetic tape past the heads during a magnetic recording interval, means operative following the completion of the magnetic recording interval to rotate the drum unit repeatedly to move the magnetic tape repeatedly past the magnetic heads and to move the visual record medium repeatedly past the visual recorder, means operative during the successive rotations of the drum unit following the magnetic recording interval to electrically connect the visual recorder in succession to the magnetic heads individually for reproduction by the visual recorder on the visual record medium of the individual magnetic recordings on the magnetic tape, and means operative upon each successive rotation of the drum unit to index the visual recorder successively from one channel to the next across the visual record medium.

10. Recording apparatus comprising a rotary drum unit, a multichannel magnetic record extending around the drum unit at a portion of the latter's periphery, a multichannel visual record extending around the drum unit at another portion of the latter's periphery, multichannel magnetic recording and playback head means positioned adjacent said magnetic record to record signals thereon as the drum unit rotates to move the magnetic record past said head means during a magnetic recording interval and to reproduce the recorded signals from the magnetic record upon repeat rotation of the drum unit following the magnetic recording interval, visual recorder means positioned to record on said visual record as the drum unit rotates to move the visual record past said visual recorder means, and means operative during repeat rotation of the drum unit for connecting said visual recorder means to said magnetic head means to record on the visual record the signals previously recorded on said magnetic record.

11. Recording apparatus comprising a plurality of magnetic recording and playback head means, a multichannel magnetic record mounted for movement past said magnetic head means during a magnetic recording interval for the recording on said magnetic record of input signals to the respective magnetic head means and for repeat movement past said magnetic head means following the magnetic recording interval for the reproduction of the recorded signals, a multichannel visual record medium mounted for movement in physical synchronism together with said magnetic record, visual recorder means in recording relation to said visual record medium, and means for connecting said visual recorder means to said magnetic head means during repeat movements of the magnetic record past said magnetic head means to record on the visual record medium the signals previously recorded on said magnetic record.

12. Apparatus for recording a plurality of transient signals, comprising a plurality of magnetic recording and reproducing head means, a multichannel magnetic record mounted for movement past said magnetic head means during a magnetic recording interval for the simultaneous recording on said magnetic record of a plurality of transient signals to respective ones of the magnetic head means and for repeat movement past the magnetic head means following the magnetic recording interval for the reproduction of the magnetically recorded signals, visual recorder means, a multichannel visual record medium mounted for movement repeatedly past said visual recorder means following the magnetic recording interval, means for connecting said visual recorder means sequentially to individual ones of said magnetic head means upon successive repeat movements of said magnetic record and said visual record medium past said magnetic head means and said visual recorder means, respectively, to sequentially reproduce on said visual record medium the individual magnetic recordings at the respective channels on the magnetic record, and drive mechanism for moving said magnetic record and said visual record medium together in physical synchronism during said repeat movements thereof to maintain among the signal reproductions on the visual record medium at the several channels thereon the same time relationship as among the recorded signals at the several channels on the magnetic record.

13. In a multichannel recorder, the combination of a multichannel memory device having provision for recording and reproducing individual signals on the respective channels, a multichannel visual record chart, a pen recorder mounted to record a visual trace on said visual record chart, means for moving said visual record chart repeatedly past said pen recorder, means for indexing said pen recorder from one channel to the next across said visual record chart upon successive movements of the visual record chart past the pen recorder, and means for actuating said pen recorder successively in response to the individual signals reproduced from the respective channels on said multichannel memory device to record said signals individually in succession as visual traces at successive channels on the visual record chart upon successive movements of the visual record chart past the pen recorder.

14. The recorder of claim 13, wherein there is provided means supporting said pen recorder so as to be free to record visual traces overlapping the adjacent channels on the visual record chart.

References Cited in the file of this patent
UNITED STATES PATENTS

| | | |
|---|---|---|
| 2,370,133 | Begun | Feb. 27, 1945 |
| 2,573,748 | Weinstein et al. | Nov. 6, 1951 |

UNITED STATES PATENT OFFICE

CERTIFICATE OF CORRECTION

Patent No. 2,803,515                                  August 20, 1957

Semi Joseph Begun et al.

It is hereby certified that error appears in the printed specification of the above numbered patent requiring correction and that the said Letters Patent should read as corrected below.

Column 16, line 67, before "portion" insert -- other --.

Signed and sealed this 15th day of October 1957.

(SEAL)
Attest:
KARL H. AXLINE
Attesting Officer

ROBERT C. WATSON
Commissioner of Patents